Nov. 8, 1966   A. H. VEDVIK ET AL   3,283,899
AUTOMATIC FOOD QUALITY CONTROL MEANS
Filed Feb. 27, 1963
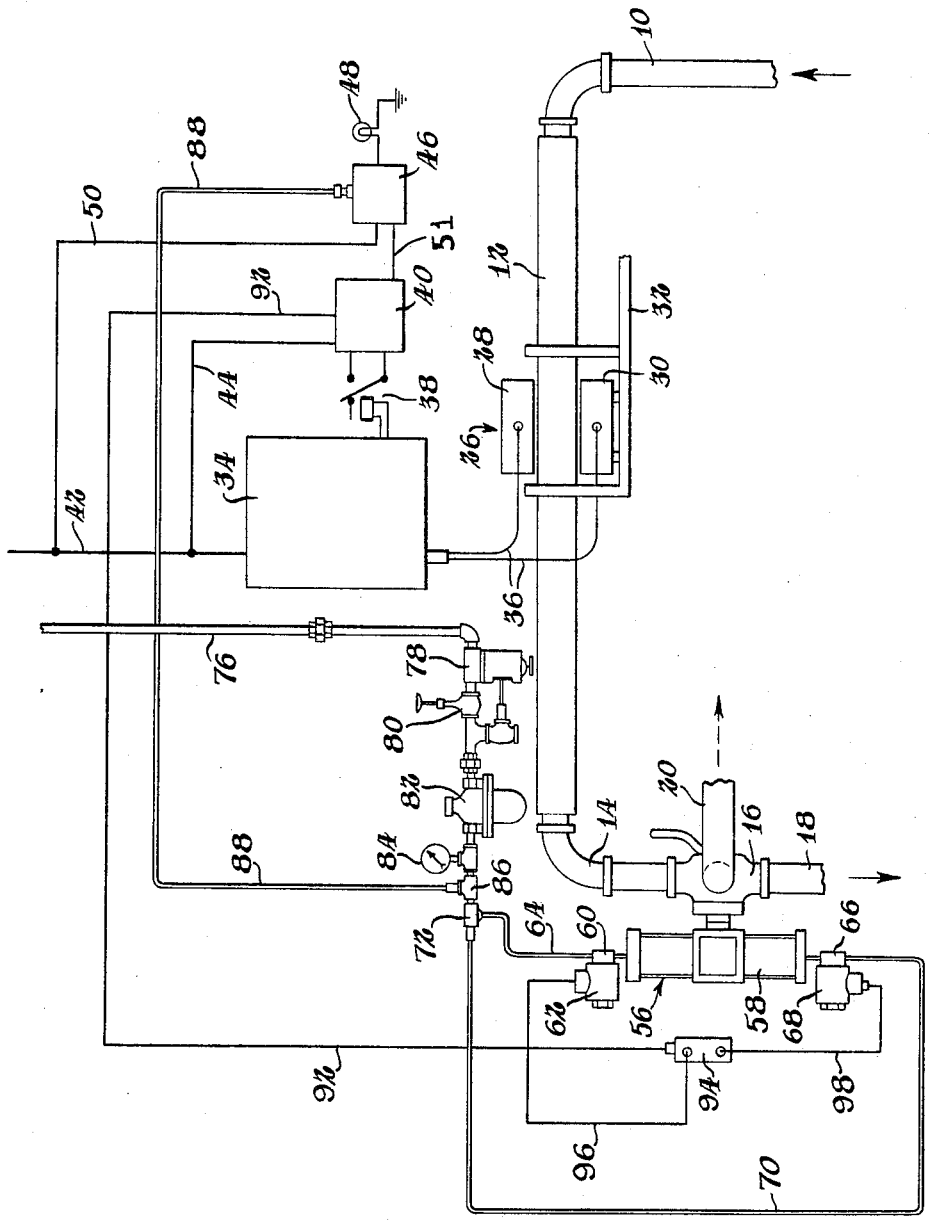
INVENTORS
ANDREW H. VEDVIK
BOLESLAUS J. SADESKI
BY JUSTIN R. JELLINGS
Cromwell, Greist & Warden
Attys.

United States Patent Office 3,283,899
Patented Nov. 8, 1966

3,283,899
AUTOMATIC FOOD QUALITY CONTROL MEANS
Andrew H. Vedvik, Justin R. Jellings, and Boleslaus J. Sadeski, Madison, Wis., assignors to Oscar Mayer & Co., Inc., Chicago, Ill., a corporation of Illinois
Filed Feb. 27, 1963, Ser. No. 261,429
1 Claim. (Cl. 209—111.8)

This invention relates to automatic quality control means for a food processing system wherein food batter is continuously advanced through conduit means toward one or more processing zones, and more particularly to automatic means for preventing batter having metallic particles therein from advancing to the processing zone or zones.

Modern day food processing systems, such as those employed in making sausages, for example, include mixing sausage batter in large quantities in a hopper or like receptacle from which the batter is pumped through appropriate conduit means to a series of processing zones usually beginning with a stuffing nozzle zone and usually ending at a packaging zone where the sausages in finished form are packaged for delivery to consumers. Obviously, it is necessary to detect any metal particles which may be accidentally incorporated in the food batter so that the batter containing such particles may be removed before an end product containing such batter reaches the consumer. From the standpoint of economical operation of continuous food processing systems, it is desirable to remove or reject batter containing metal particles before the batter reaches the various processing zones in the system.

Accordingly, it is a primary object of this invention to provide in a food processing system wherein food batter is continuously advanced through conduit means toward a processing zone, automatic means for preventing batter having metallic particles therein from advancing to the processing zone.

It is a further object of the present invention to provide in a food processing system wherein food batter is continuously advanced through conduit means toward a processing zone, automatic means for preventing batter having metallic particles therein from advancing to the processing zone, which means includes electronic detection means.

It is an even further object of this invention to provide in a food processing system wherein food batter is continuously advanced through conduit means toward a processing zone, automatic means for preventing batter having metallic particles therein from advancing to the processing zone, which means includes an electronic detector and valve means for by-passing batter containing metallic particles, the valve means being adapted to be operated for by-passing such batter when the detector is activated by a metallic particle.

It is a still further object of the present invention to provide in a food processing system wherein food batter is continuously advanced through conduit means toward a processing zone, automatic means for preventing batter having metallic particles therein from advancing to the processing zone, which means includes timing means for automatically resuming the flow of batter to the processing zone after batter containing metallic particles has been by-passed.

These and other objects and advantages of the invention will become apparent from the following specification wherein like numerals refer to similar parts throughout.

The accompanying drawing in a partial elevation and partial schematic of one embodiment of this invention.

Briefly and by way of introduction, this invention includes the provision of a non-metallic section of conduit in a length of conduit extending from a food batter hopper or the like to a processing zone as in a continuous food processing system. Suitable detection means, such as an electronic detector, is mounted adjacent the non-metallic conduit for detecting metallic particles in the batter being continuously advanced through the conduit. A valve, such as a three-way valve, is located in the conduit means between the non-metallic conduit and the processing zone. A valve actuator is operatively associated with the movable part of the three-way valve. The valve is adapted in a first position thereof to communicate the non-metallic conduit with the conduit means extending to the processing zone. The valve is adapted in a second position thereof to communicate the non-metallic conduit with a by-pass opening. Electrical solenoids are provided for operating the valve actuator, which solenoids are in electrical communication with the electronic detector. When the detector detects the presence of metallic particles in the advancing food batter, the valve actuator is operated for moving the valve from its normal or first position to its second position for by-passing the batter containing the metallic particles through the by-pass opening. Timing means are energized simultaneously with the actuation of the valve. At the expiration of a predetermined length of time the valve actuator is again operated by means of the timing means for moving the valve from its second position to its first position for resuming the flow of batter to the processing zone. The entire means is completely automatic requiring only periodic inspection.

Referring to the drawing, a conduit or pipe 10, fragmentarily shown, extends from a hopper or other receptacle wherein food batter, such as sausage batter, for example, is to be continuously advanced toward various processing zones in a continuous food processing system. It will be understood that a food batter is to be continuously advanced through the conduit 10 in the direction of the arrow shown in the drawing. A non-metallic conduit 12, preferably made from a non-toxic plastic tubing, is in communication with the conduit 10. The non-metallic conduit 12 communicates the pipe 10 with other suitable pipe or conduit means 14, which conduit means 14 is in communication with the inlet port of a three-way valve 16. The valve 16 includes a discharge port communicating with a pipe or conduit 18, which conduit 18 extends to a processing zone, such as a stuffing nozzle for sausage batter. The three-way valve 16 also includes a by-pass opening or port communicating with a by-pass conduit or pipe 20. It will be understood that the three-way valve 16, which of itself is of known construction, includes a movable valve member (not shown) adapted in a first or normal position thereof to communicate the non-metallic conduit 12 with the conduit 18. The movable valve member in the valve 16 is adapted in a second position thereof to communicate the non-metallic conduit 12 with the by-pass conduit 20. In other words, when the movable member in the valve 16 is in its normal position, food batter is permitted to be continuously advanced through the conduits 10, 12, 14 and 18 toward the processing zones in the continuous food processing system. Movement of the movable member in the valve 16 from the normal position causes the food batter advancing through conduits 10, 12 and 14 to be by-passed or diverted through conduit 20.

Preferably, electronic metal detection means are provided for detecting the presence of metallic particles in food batter advancing through the non-metallic conduit 12. However, it will be realized that other suitable detection means, such as magnetic detection means, could be used in the automatic means of this invention. In the drawing an electronic metal detector, such as the model S-850 detector manufactured by Radio Corporation of America, of Camden, New Jersey, is schematically illustrated. This detector includes a sensor or inspection head generally designated 26, which sensor includes upper and lower parts 28 and 30 respectively. The sensor 26 is mounted adjacent the non-metallic conduit 12 by suitable support bracket means 32 with the parts 28 and 30 being located above and below the conduit 12, respectively. The sensor 26 is in electrical communication with a control unit 34 of the detector by leads 36. The control unit of the detector includes a relay 38 in electrical connection with an electric timer 40 of suitable construction. A main A.C. power supply line 42 supplies power to the electronic detector and associated components, and a lead 44 extends from line 42 for applying power to the timer. A pressure switch 46 having a warning light 48 associated therewith is electrically connected with main line 42 and timer 40 by leads 50 and 51, respectively. The operation and purpose of pressure switch 46 and warning light 48 will be explained hereinafter.

A suitable valve actuator, such as a pneumatic actuator generally designated 56, is provided for moving the movable valve member in the three-way valve 16. The valve actuator, which is itself of known construction, includes a cylinder 58 having a piston therein and appropriate linkage (not shown) for moving the movable valve member of the valve between its first and second positions and vice versa. An air valve 60 adapted to be operated by a solenoid 62 is provided at one end of the cylinder 58 for admitting air thereinto from an air conduit 64. A like air valve 66 adapted to be operated by a solenoid 68 is provided at the other end of the cylinder 58 for admitting air thereinto from an air conduit 70. The air conduit 64 and 70 join at a T 72. Air under pressure from a suitable source is admitted to the T 72 from a main air conduit 76 through an air filter 78, a shut-off valve 80, a pressure regulator governor 82 and a pressure gauge 84. A T 86 is connected between the pressure gauge 84 and T 72, which T connects with an air conduit 88 for admitting air under pressure to the pressure switch 46. Energizing of solenoid 62 opens valve 60 thereby permitting air under pressure from air conduit 64 to be admitted to one end of the cylinder 58 of the valve actuator 56. This operates the actuator 56 for moving the valve member of valve 16 from its normal or first position wherein non-metallic conduit 12 is in communication with conduit 18 to its second position wherein conduit 12 communicates with by-pass conduit 20. Energizing of solenoid 68 opens air valve 66 for admitting air under pressure from air conduit 70 into the other end of the cylinder 58 of the valve actuator 56. This action moves the movable valve member in valve 16 from its second position to its first or normal position for again communicating non-metallic conduit 12 with conduit 18 thereby resuming the flow of batter to the processing zone or zones of the continuous food processing system.

An electric line 92 connects timer 40 with an electrical junction box 94. Electrical lines 96 and 98 connect the junction box 94 with solenoids 62 and 68, respectively.

The operation of the above described means for preventing food batter having metallic particles therein from advancing to one or more processing zones in a continuous food processing system will now be described:

In the above referred to RCA model S-850 electronic metal detector, two field coils are provided in the upper part 28 of the sensor or inspection head 26. The control unit 34 of this detector contains an oscillator-amplifier section, a receiver, a control relay section and a power supply common to the two sections. The oscillator-amplifier circuit feeds electric current to the field coils in the upper part 28. A receiver coil is located in the lower part 30 of the sensor 26, and this receiver is positioned so that it couples equally with the two oscillator field coils in upper part 28. The two field coils are so wound that their induced voltages cancel each other in the receiver coil. The small amount of residual unbalanced voltage remaining in the receiver coil is amplified in a radio frequency amplifier, detected by a silicone diode, and the resultant detected modulation envelope further amplified in the control relay section. The amplified modulation envelope is then applied to the control grid of a thyratron tube in the control unit 34 where its momentary level determines whether or not the thyratron tube shall trigger. If batter being continuously advanced through conduit 12 contains metallic particles, as these particles pass between the parts 28 and 30 the residual voltage in the receiver coil undergoes a momentary amplitude change due to the absorption or energy from the coils by eddy currents in the metallic particles, and due to changes in relative phase between the induced voltages. The residual unbalanced voltage is therefore modulated by the passage of metal between parts 28 and 30. This modulation is amplified, detected and creates a pulse at the grid of the thyratron tube where it triggers the same. The passage of metal between parts 28 and 30 in triggering the thyratron tube in the control unit 34 causes a voltage drop across relay 38 so that the same is de-energized. This causes timer 40 to be energized from the main line 42 through line 44. Simultaneously with the energizing of the timer 40 solenoid 62 is energized by current passing through timer 40, 92 and line 96. As explained above, energizing of solenoid 62 causes the movable valve member in valve 16 to move to its second position for communicating non-metallic conduit 12 with by-pass conduit 20. Accordingly, food batter is by-passed or rejected through conduit 20 almost instantaneously after metallic particles are detected by the sensor 26.

As mentioned above, timer 40 is energized instantaneously with the detection of metallic particles by the sensor 26. The purpose of the timer is to maintain the movable valve member in valve 16 in its second or by-pass position until the portion of batter containing the metallic particles has been completely by-passed through conduit 20. For purposes of illustration, let it be assumed that timer 40 is set at 15 seconds. Of course the length of this time will depend on the velocity of food batter moving through the conduits and the distance between the sensor 26 and three-way valve 16. Also, this period of time will include a safety factor to insure that all of the batter containing metallic particles is by-passed through conduit 20. At the end of this fifteen second period timer 40 causes solenoid 62 to be de-energized and solenoid 68 to be simultaneously energized. This causes air valve 60 to close and air valve 66 to open for admitting air from air conduit 70 into the other end of cylinder 58 of the actuator 56. This action operates the actuator for moving the movable valve member in valve 16 from its second position to its first or normal position for again communicating non-metallic conduit 12 with conduit 13, thereby resuming the flow of batter to one or more processing zones in the continuous food processing system.

After a metallic particle has passed through conduit 12 beyond sensor 26, relay 38 will again be energized after a short time delay, which time delay is a built-in factor in the above referred to model S-850 detector. Although relay 38 may be energized before the expiration of the time set in timer 40, the timer will continue to maintain solenoid 62 energized and solenoid 68 de-energized until the expiration of the time set on the timer. If a second metallic particle should closely follow a first metallic particle, i.e., if the second particle should pass through sensor 26 while timer 40 is running, the timer will be reset and start again for the full length of time set thereon. This precludes the possibility of the valve 16 returning to its normal position before the second metallic particle is by-passed through conduit 20. The timer operates in this same manner if additional metallic particles follow in closely spaced relationship.

In other words, valve 16 will remain in the by-pass condition as long as metallic particles pass through sensor 26 and for the full time set in timer 40 beginning from the instant the last metallic particle passes through the sensor.

Pressure switch 46 is constantly energized through lead 50 from the main power supply line. This switch is pneumatically actuated and will remain closed for illuminating warning light 48 as long as air pressure is admitted to the switch through air conduit 88. Illumination of warning light 48 indicates to an attendant that air pressure is being supplied to the automatic means of this invention for operation of valve actuator 56. Pressure switch 46 is in electrical communication with both solenoids 62, 68 by leads 51 and 92. A release of air pressure in the pressure switch, as by closing valve 80, results in simultaneous removal of electric power from both solenoids. De-energizing the solenoids permits bleeding of valve actuator 56. It is desirable to bleed the valve actuator before the same is inspected or disassembled to prevent injury to personnel, and the pressure switch provides a convenient means for accomplishing this end.

The automatic means of this invention may be tested while the continuous food processing system remains in operation and without wasting batter by shutting air valve 80 and by bringing a small piece of metal in the vicinity of the sensor 26. Closing of air valve 80 will render air actuator 56 inoperative and will allow bleeding of the same from both ends leaving the movable valve member in valve 16 in its first or normal position wherein non-metallic conduit 12 is in communication with conduit 18. The presence of the small piece of metal in the vicinity of sensor 26 will cause timer 40 to commence running thereby providing a ready check on the operation of the detector and timer. This test can be performed in a relatively short period of time so that only a relatively small amount of food batter is allowed to pass through conduit 12 without being tested for the presence of metallic particles. Of course, the flow of food batter through conduit 12 can be stopped by closing a valve (not shown) located in conduit 10. In other words, the continuous food processing system may be momentarily stopped at which time the operation of the detector and timer as well as the pneumatic valve actuator may be checked.

Thus it will be seen that by this invention automatic means have been provided for preventing food batter having metallic particles therein from advancing to one or more processing zones in a food processing system wherein food batter is being continuously advanced. The means of this invention is completely automatic and may be continuously operated during operation of a continuous food processing system. The automatic means of this invention requires little attendance, and all components of the automatic means are durable and reliable in operation.

While the invention has been shown in but one form it will be obvious to those skilled in the art that it is not to be so limited, but on the contrary it is susceptible of various changes and modifications without departing from the spirit and scope of the appended claim.

We claim:

In a food processing system wherein food batter is continuously advanced through conduit means toward a processing zone, automatic means for preventing batter having metallic particles therein from advancing to the processing zone comprising, a non-metallic conduit in said conduit means, an electronic metal detector having a sensing head mounted adjacent said non-metallic conduit, valve means located in said conduit means between said non-metallic conduit and said processing zone, which valve means includes a by-pass opening, said valve means being adapted in a first position thereof to communicate said non-metallic conduit with said processing zone and being adapted in a second position thereof to communicate said non-metallic conduit with said by-pass opening, a pneumatic valve actuator operatively associated with said valve means for actuating the same between said two positions, means supplying air under pressure to said pneumatic valve actuator, solenoid means for controlling the air supply to said valve actuator for operating the same electric timing means connected with said solenoid means and arranged with the same so that upon energizing of such timing means said valve means is substantially instantaneously actuated to its second position and automatically returned to its first position after a predetermined length of time which is determined by said timing means, said detector being in electrical communication with said timing means for energizing the latter upon activation of the former by the presence of metallic particles in said non-metallic conduit, and warning means actuated by the air pressure in said air supply means for indicating whether or not an adequate supply of air is in communication with said pneumatic valve actuator.

References Cited by the Examiner
UNITED STATES PATENTS

| | | | |
|---|---|---|---|
| 2,237,254 | 4/1941 | Broekhuysen | 209—81 |
| 2,295,366 | 8/1942 | Stout | 209—111.7 X |
| 2,587,686 | 3/1952 | Berry | 209—81 |
| 3,117,080 | 1/1964 | Krestin | 209—1 |

FRANK W. LUTTER, *Primary Examiner.*